United States Patent
Hahn et al.

(10) Patent No.: US 9,392,635 B2
(45) Date of Patent: Jul. 12, 2016

(54) METHOD AND UE FOR NETWORK ATTACHMENT

(71) Applicant: LG ELECTRONICS INC., Seoul (KR)

(72) Inventors: Genebeck Hahn, Seoul (KR); Jaehoon Chung, Seoul (KR); Hyeyoung Choi, Seoul (KR); Eunjong Lee, Seoul (KR); Heejeong Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 131 days.

(21) Appl. No.: 14/273,251

(22) Filed: May 8, 2014

(65) Prior Publication Data

US 2014/0335859 A1   Nov. 13, 2014

Related U.S. Application Data

(60) Provisional application No. 61/821,217, filed on May 8, 2013, provisional application No. 61/876,187, filed on Sep. 10, 2013.

(51) Int. Cl.
| | |
|---|---|
| *H04W 76/04* | (2009.01) |
| *H04W 60/00* | (2009.01) |
| *H04W 48/14* | (2009.01) |
| *H04W 88/08* | (2009.01) |
| *H04W 16/32* | (2009.01) |

(52) U.S. Cl.
CPC .............. *H04W 76/04* (2013.01); *H04W 48/14* (2013.01); *H04W 60/005* (2013.01); *H04W 16/32* (2013.01); *H04W 88/085* (2013.01)

(58) Field of Classification Search
CPC ..... H04L 5/001; H04L 5/0035; H04L 5/0073; H04L 5/0032
See application file for complete search history.

(56) References Cited

U.S. PATENT DOCUMENTS

| | | | |
|---|---|---|---|
| 2012/0207105 A1* | 8/2012 | Geirhofer | H04L 5/0032 370/329 |
| 2013/0040683 A1* | 2/2013 | Siomina | H04W 28/0236 455/517 |
| 2013/0094435 A1* | 4/2013 | Deng | H04W 24/02 370/315 |
| 2013/0203411 A1* | 8/2013 | Cheng | H04W 48/18 455/435.1 |
| 2014/0169264 A1* | 6/2014 | Katori | H04L 45/54 370/315 |
| 2014/0241301 A1* | 8/2014 | Nakashima | H04W 52/325 370/329 |
| 2014/0247796 A1* | 9/2014 | Ouchi | H04L 5/0053 370/329 |
| 2014/0286243 A1* | 9/2014 | Yamada | H04W 76/025 370/329 |

* cited by examiner

*Primary Examiner* — Khalid Shaheed
*Assistant Examiner* — Ernest Tacsik
(74) *Attorney, Agent, or Firm* — Lee, Hong, Degerman, Kang & Walmey; Jonathan Kang; Michael Monaco

(57) ABSTRACT

A method and a user equipment (UE) for network attachment are disclosed. The method includes receiving first status information associated with one or more remote radio units (RRUs) for supporting the small cell from the one or more RRUs, receiving second status information associated with one or more macro cells from one or more macro eNBs for supporting the macro cell, selecting an RRU and macro eNB, which the UE wants to attach, among the one or RRUs based on the first status information and the second status information, and simultaneously transmitting an attach request message for requesting network attachment from the selected RRU and macro eNB to the selected RRU and macro eNB.

10 Claims, 12 Drawing Sheets

McNB : macro eNode B   MUE : macro UE
PcNB : pico eNodeB     PUE : pico UE
FeNB : femto eNode B   FUE : femto UE

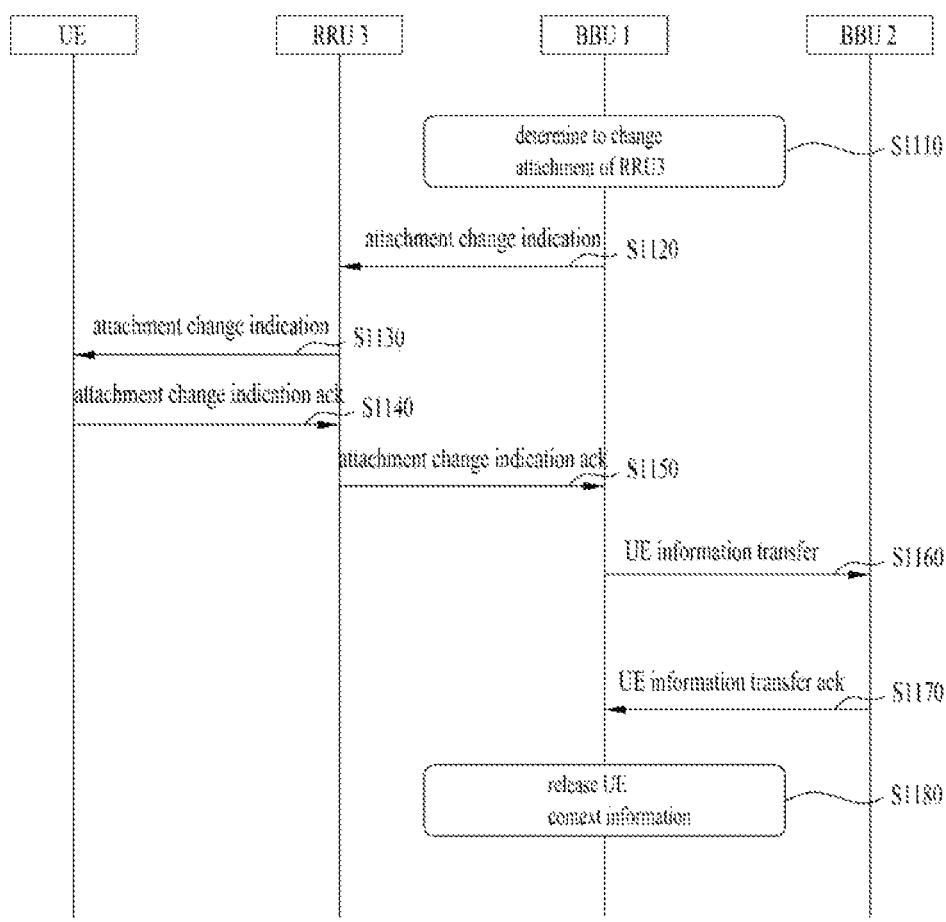

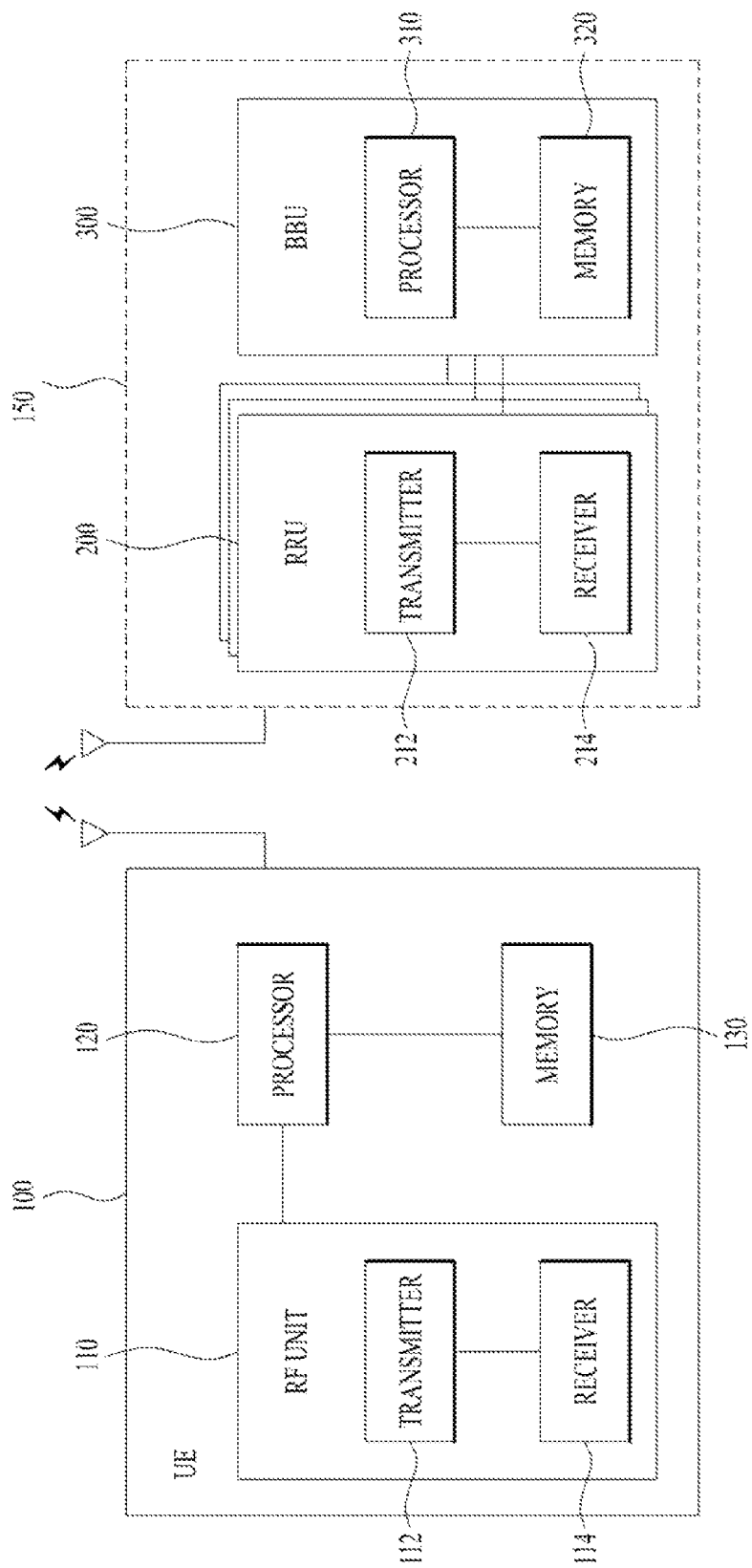

METHOD AND UE FOR NETWORK ATTACHMENT

CROSS-REFERENCE TO RELATED APPLICATIONS

Pursuant to 35 U.S.C. §119(e), this application claims the benefit of U.S. Provisional Patent Application Nos. 61/821,217, filed on May 8, 2013, and 61/876,187, filed on Sep. 10, 2013, the contents of which are all hereby incorporated by reference herein in their entirety.

BACKGROUND OF THE INVENTION

1. Field of the Invention

The present invention relates to a method of network attachment with a macro eNB and a remote radio unit (RRU) by a user equipment (UE) and a UE for performing the method.

2. Discussion of the Related Art

A radio access network (RAN) configuration has been changed such that various types of small cells such as a pico cell, a femto cell, etc. interact with a macro cell. The RAN configuration refers to a heterogeneous cell configuration or a hierarchical cell configuration in which small cells for low power/near field communication coexist in addition to an existing macro cell-based homogeneous network. A new RAN configuration is used to enhance quality of experience (QoE) by providing a high data transmission rate to a last user.

In small cell enhancements for E-UTRA and E-UTRAN study item (SI) as one of $3^{rd}$ generation partnership project (3GPP) standard scopes, research has been ongoing into enhancement of indoor/outdoor scenarios using low power nodes, and the scenarios is described in TR 36.932. In small cell enhancements for E-UTRA and E-UTRAN SI, research has been conduced to draw advantages of concept of dual connectivity to small cell layers and a macro cell layer in which a user uses the same or different carriers.

Considering this trend, a huge number of small cells will be deployed and thus UEs will get nearer to a network physically. Accordingly, it is expected that not conventional physical cell-based communication but communication through UE-centered zones will be conducted in a future-generation wireless access network. To implement communication through UE-centered zones to increase capacity, technical issues to realize a service providing unit such as a UE-centered zone differentiated from a physical cell-based service providing unit should be derived and solved, which will greatly affect a current RAN.

SUMMARY OF THE INVENTION

Accordingly, the present invention is directed to a method and a user equipment (UE) for network attachment that substantially obviate one or more problems due to limitations and disadvantages of the related art.

An object of the present invention is to provide a method and UE for network attachment for a UE-centered zone by a UE.

Another object of the present invention is to provide a method and UE for actively analyzing information associated with an RRU and a macro eNB and dynamically establishing network attachment by the UE.

Another object of the present invention is to provide a method and UE for changing connectivity between an RRU and a macro eNB over time to reflect change in a network status so as to perform a network attachment procedure.

A further object of the present invention is to provide a method and UE for adjusting connectivity between an RRU and a BBU over time to effectively support network attachment of the UE.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for network attachment of a user equipment (UE) in a heterogeneous cell environment in which a macro cell and a small cell coexist includes receiving first status information associated with one or more remote radio units (RRUs) for supporting the small cell from the one or more RRUs, receiving second status information associated with one or more macro cells from one or more macro eNBs for supporting the macro cell, selecting an RRU and macro eNB, which the UE wants to attach, among the one or more RRUs and among the one or more macro eNBs based on the first status information and the second status information, and simultaneously transmitting an attach request message to the selected RRU and the selected macro eNB, for requesting network attachment to the selected RRU and the selected macro eNB.

The selecting may include selecting an RRU providing connectivity that is equal to or greater than a threshold to the UE among the one or more RRUs and selecting an RRU providing optimum connectivity as an RRU that the UE wants to connect among the RRUs providing the connectivity that is equal to or greater than the threshold.

The first status information and the second status information may include information about load status and resource usage status of the one or more RRUs and the one or more macro eNB, respectively.

The method may further include receiving a first RRC connection reconfiguration message for radio bearer configuration from the selected RRU and the selected macro eNB.

The method may further include transmitting an RRC connection reconfiguration complete message from the selected RRU and the selected macro eNB when radio bearer configuration with the selected RRU and the selected macro eNB is completed according to the first RRC connection reconfiguration message.

The attach request message transmitted to the selected RRU may further include information about a macro eNB providing best link quality to the UE among the one or more macro eNBs.

The method may further include receiving a second RRC connection reconfiguration message indicating that a macro eNB that will be connected to the selected RRU from the selected RRU.

The method may further include acquiring information about a point of time when connectivity of the selected RRU is changed, from the second RRC connection reconfiguration message, and performing network attachment with a macro eNB to which the selected RRU is newly connected, after the point of time.

In another aspect of the present invention, a user equipment (UE) for network attachment in a heterogeneous cell environment in which a macro cell and a small cell coexist includes a transmitter, a receiver, and a processor connected to the transmitter and the receiver to perform network attachment, wherein the processor controls the receiver to receive first status information associated with one or more remote radio units (RRUs) for supporting the small cell from the one or more RRUs and to receive second status information associated with the macro cell from one or more macro eNBs for supporting the macro cell, selects an RRU and macro eNB, which the UE wants to attach, among the one or more RRUs and among the one or more macro eNBs based on the first status information and the second status information, and controls the transmitter to simultaneously transmit an attach request message to the selected RRU and the selected macro eNB, for requesting network attachment to the selected RRU and the selected macro eNB.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 11 is a diagram for explanation of a method of changing attachment of an RRU according to an embodiment of the present invention;

FIG. 12 is a block diagram of a structure of a UE, an RRU, and a BBU according to an embodiment of the present invention.

DETAILED DESCRIPTION OF THE INVENTION

Figure 1:
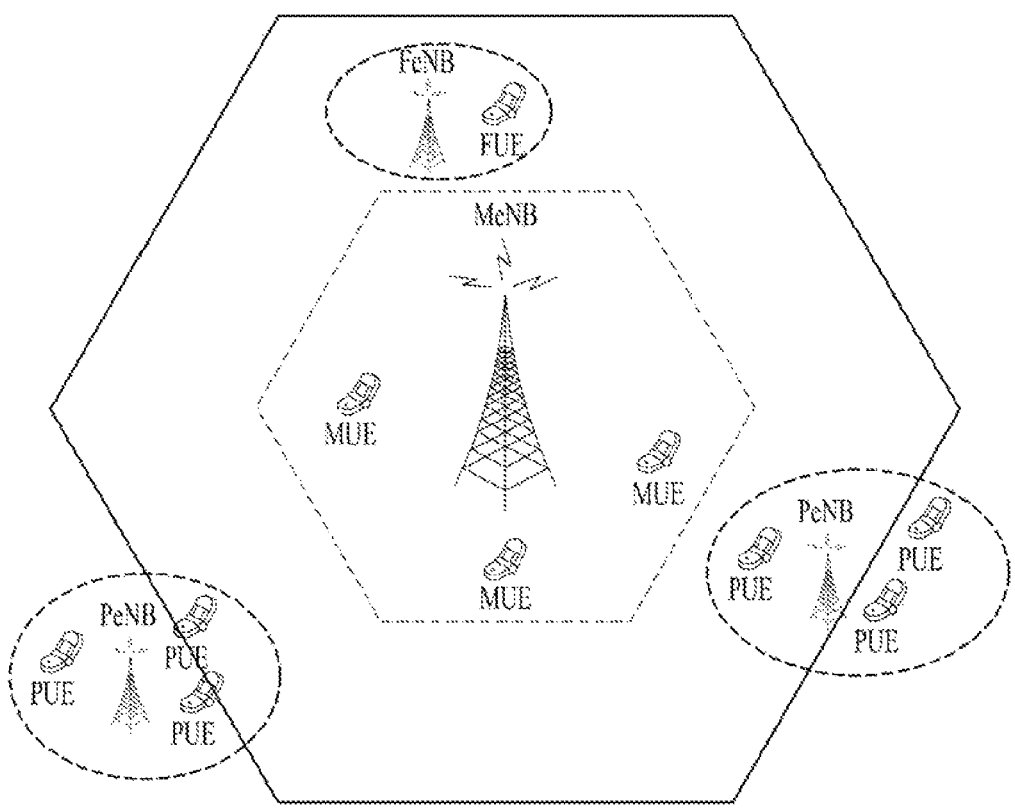
FIG. 1 illustrates a heterogeneous network wireless deployment according to the present invention.

Most of the terms used herein are general terms that have been widely used in the technical art to which the present invention pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present invention.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of the drawings, procedures or steps which render the scope of the present invention unnecessarily ambiguous will be omitted and procedures or steps which can be understood by those skilled in the art will be omitted.

In the disclosure, 'include' or 'comprise' should be interpreted as that other components may further be included, not excluded, unless otherwise specified. It will be understood that when an element is referred to as being "connected to" or "coupled to" another element, the terms may include physical connection as well as physical connection and may also refer to logical connection. The term '-unit', '-or(er)', 'module', etc. signifies at least one function or operation processing unit that can be implemented in hardware, software, or a combination thereof. In addition, it is to be understood that the singular forms 'a, 'an', and 'the' include plural referents unless the context clearly dictates otherwise.

In the embodiments of the present invention, a description is made, centering on a data transmission and reception relationship between an eNB and a user equipment (UE). The eNB is a terminal node of a network, which communicates directly with a UE. In some cases, a specific operation described as performed by the eNB may be performed by an upper node of the BS.

Namely, it is apparent that, in a network comprised of a plurality of network nodes including an eNB, various operations performed for communication with a UE may be performed by the eNB, or network nodes other than the eNB. The term 'base station (BS)' may be replaced with the term 'fixed station', 'Node B', 'evolved Node B (eNode B or eNB)', an advanced base station (ABS), or an access point, etc.

In addition, the term 'mobile station (MS)' may be replaced with the term 'user equipment (UE)', 'subscriber station (SS)', 'mobile subscriber station (MSS)', 'mobile terminal', 'advanced mobile station (AMS), 'terminal', etc. In particular, the MS can have the same meaning as an M2M device.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station becomes a transmitter.

The embodiments of the present invention are supported by standard documents disclosed in at least one of the Institute of Electrical and Electronic Engineers (IEEE) 802.xx system, the 3rd generation partnership project (3GPP) system, the 3GPP long term evolution (LTE) system and the 3GPP2 system, all of which are wireless access systems. That is, the steps or the portions of the embodiments of the present invention which are not described in order to clarify the technical spirit are supported by the above-described documents.

All the terms disclosed in the present specification may be described by the above-described standard documents. In particular, embodiments of the present invention can be supported by one or more of P802.16e-2004, P802.16e-2005, P802.16.1, P802.16p, and P802.16.1b standard documents that are standard documents of the IEEE 802.16 system.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

1. Heterogeneous Network Deployment

FIG. 1 illustrates a heterogeneous network wireless deployment according to the present invention.

To guarantee a more stable data service such as multimedia service in future-generation mobile communication, much attention has been attracted to a hierarchical cell structure or heterogeneous cell structure in which micro cells (pico cells or femto cells) are co-located within a macro cell-based homogeneous network. This is because installation of additional macro eNode Bs is inefficient in terms of cost and complexity relative to system performance improvement.

A heterogeneous network configuration under consideration for a future-generation communication network may be established as illustrated in FIG. 1. A plurality of small cells may coexist in one macro cell and each serve corresponding UEs by resource allocation based on cell coordination. As one of core technologies for the aforementioned heterogeneous network deployment, a remote radio unit (RRU) and a baseband unit (BBU) can be separated from each other.

2. C-RAN Deployment in which RRU and BBU are Separated

Figure 2:
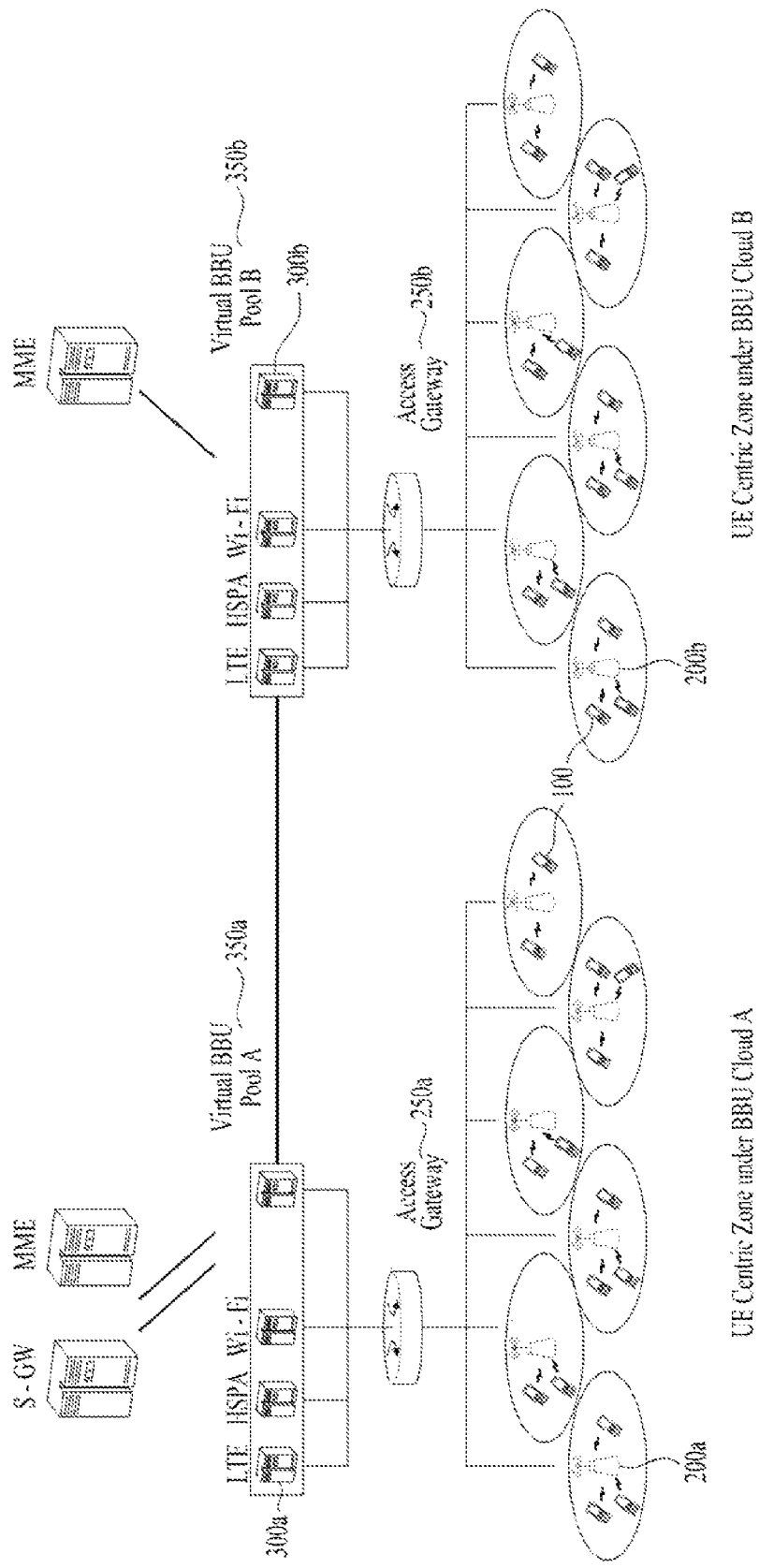
FIG. 2 is a diagram illustrating a cloud radio access network (C-RAN) deployment according to an embodiment of the present invention.

FIG. 2 is a diagram illustrating a cloud radio access network (C-RAN) deployment according to an embodiment of the present invention. The C-RAN deployment may include a plurality of RRUs 200a and 200b and software-based virtual BBU pools 350a and 350b or a virtual base station (VBS) and access control/resource management/authentication servers for controlling them, etc. In the C-RAN deployment, as elements of a core network are changed to an open-type IP network, various elements of the C-RAN are connected directly to the elements of the core network with an organic relation therebetween.

An example of the C-RAN deployment may include deployment in which the plural RRUs 200a and 200b and the BBUs 300a and 300b are separated from each other, as described above. Since the RRUs and the BBUs are separated from each other, C-RAN deployment having the following characteristics may be achieved.

First, the virtual BBU pools 350a and 350b are present and include the plural BBUs 300a and 300b, respectively. The virtual BBU pools 350a and 350b have structures associated with shared antenna system (SAS) RRUs 200a and 200b for supporting multi radio access technology (Multi-RAT) through an access gateways (GWs) 250a and 250b, respectively. The virtual BBU pools 350a and 350b may include the plural BBUs 300a and 300b for supporting various RATs, respectively. One of the RRUs 200a and 200b may be associated with one or more BBUs 300a and 300b, respectively, and on the other hand, one of the BBU 300a and 300b may be associated with one or more RRU 200a and 200b. The BBUs 300a and 300b in the virtual BBU pools 350a and 350b may be connected to the RRUs 200a and 200b and ideal/non-ideal backhaul. One virtual BBU pool 350a may be connected to another virtual BBU pool 350b through an X2 interface or a similar interface.

Second, the RRUs 200a and 200b in the virtual BBU pools 350a and 350b have the same virtual cell ID, and all the BBUs 300a and 300b and all the RRUs 200a and 200b in the virtual BBU pools 350a and 350b are connected via ideal backhaul such that the RRUs 200a and 200b are controlled by the BBUs 300a and 300b that are associated with the RRUs 200a and 200b.

Third, sync signals used for acquisition of downlink synchronization may be transmitted to the RRUs 200a and 200b and may include RRU IDs for distinguishing the RRUs 200a and 200b as well as virtual cell IDs representing the virtual BBU pools 350a and 350b to which the RRUs 200a and 200b belong.

Fourth, each of the RRUs 200a and 200b assumes a simple antenna and L1/L2/L3 layer processing is performed by the BBUs 300a and 300b present in the virtual BBU pools 350a and 350b. In addition, the RRUs 200a and 200b have the attribute of SAS, which means that the RRUs 200a and 200b can change their attachments from one BBU in the virtual BBU pools 350a and 350b to another BBU, respectively. That is, time-variant attachment of the RRUs 200a and 200b may be changed from one BBU to another BBU according to a situation of the BBUs 300a and 300b (e.g., load, resource situation, etc. of a BBU).

Conventionally, physical cells are present and UEs access the cells to receive a service. However, as described above, when an RRU and a BBU are separated from each other, a zone in which a network can provide an optimal communication environment in user units can be established so as to provide a service based on the corresponding zone.

Figure 3:
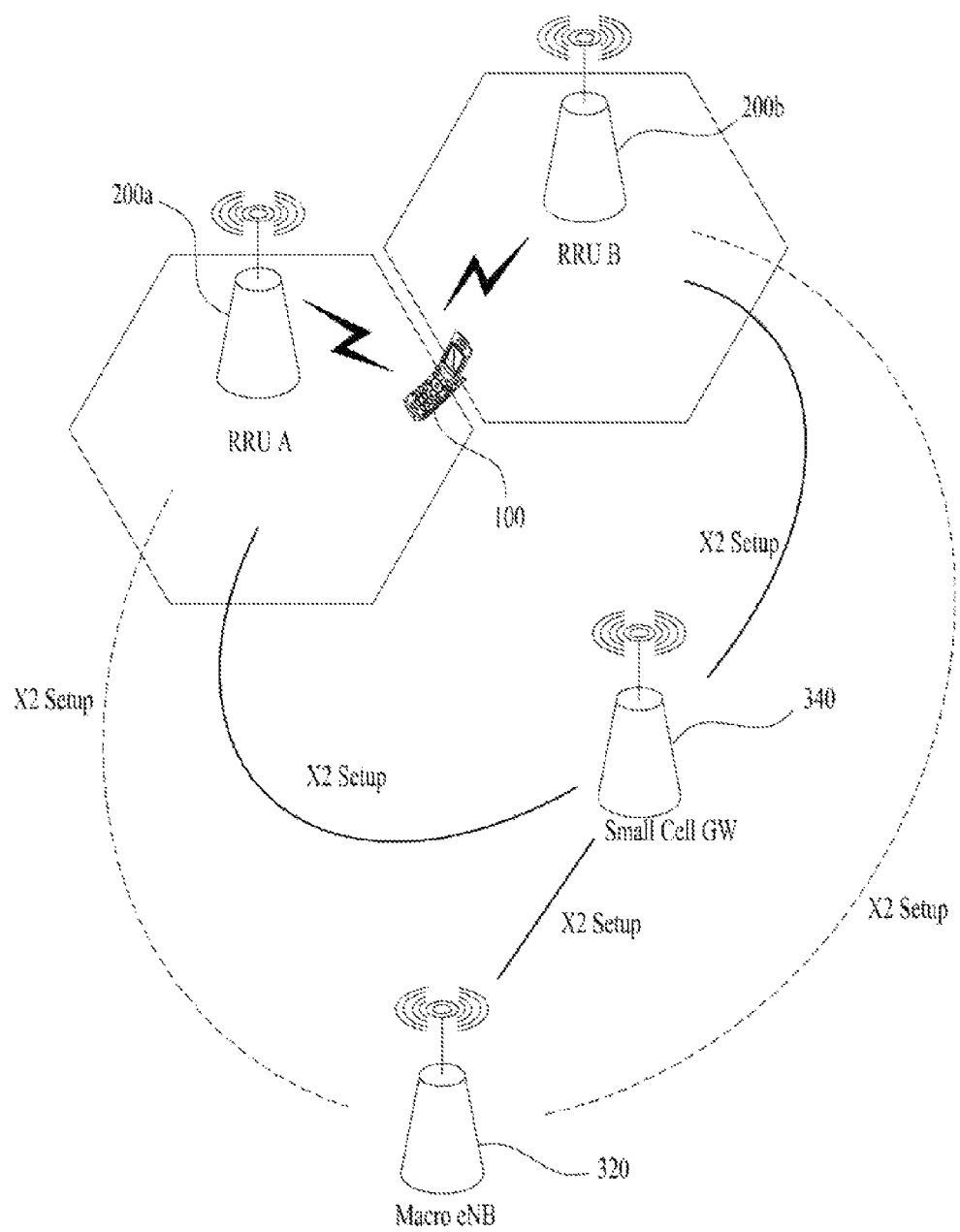
FIG. 3 is a diagram illustrating C-RAN deployment according to another embodiment of the present invention.

FIG. 3 is a diagram illustrating C-RAN deployment according to another embodiment of the present invention.

A network access method that will be described below can be applied to network deployment scenario illustrated in FIG. 3. In the network deployment illustrated in FIG. 3, a macro cell by a macro eNB 320 may operate in conjunction with the RRUs 200a and 200b and control the RRUs 200a and 200b. In the embodiment illustrated in FIG. 3, one macro eNB 320 and two RRUs 200a and 200b may be present, and the macro eNB 320 may have an interface connected directly to the RRUs 200a and 200b and have an interface connected indirectly to the RRUs 200a and 200b through a small cell GW 340.

In addition, the RRUs 200a and 200b may be connected to a macro eNB other than the macro eNB 320 illustrated in FIG. 3, and the connectivity and attachment may be time-variant, as described above, as described above. That is, this means that an RRU belonging to one macro-eNB at one time can belong to another macro eNB at another time.

3. Network Attachment Method of Network

Hereinafter, a method in which a UE accesses a network in network deployment in which a UE-centered zone is set.

Figure 4:
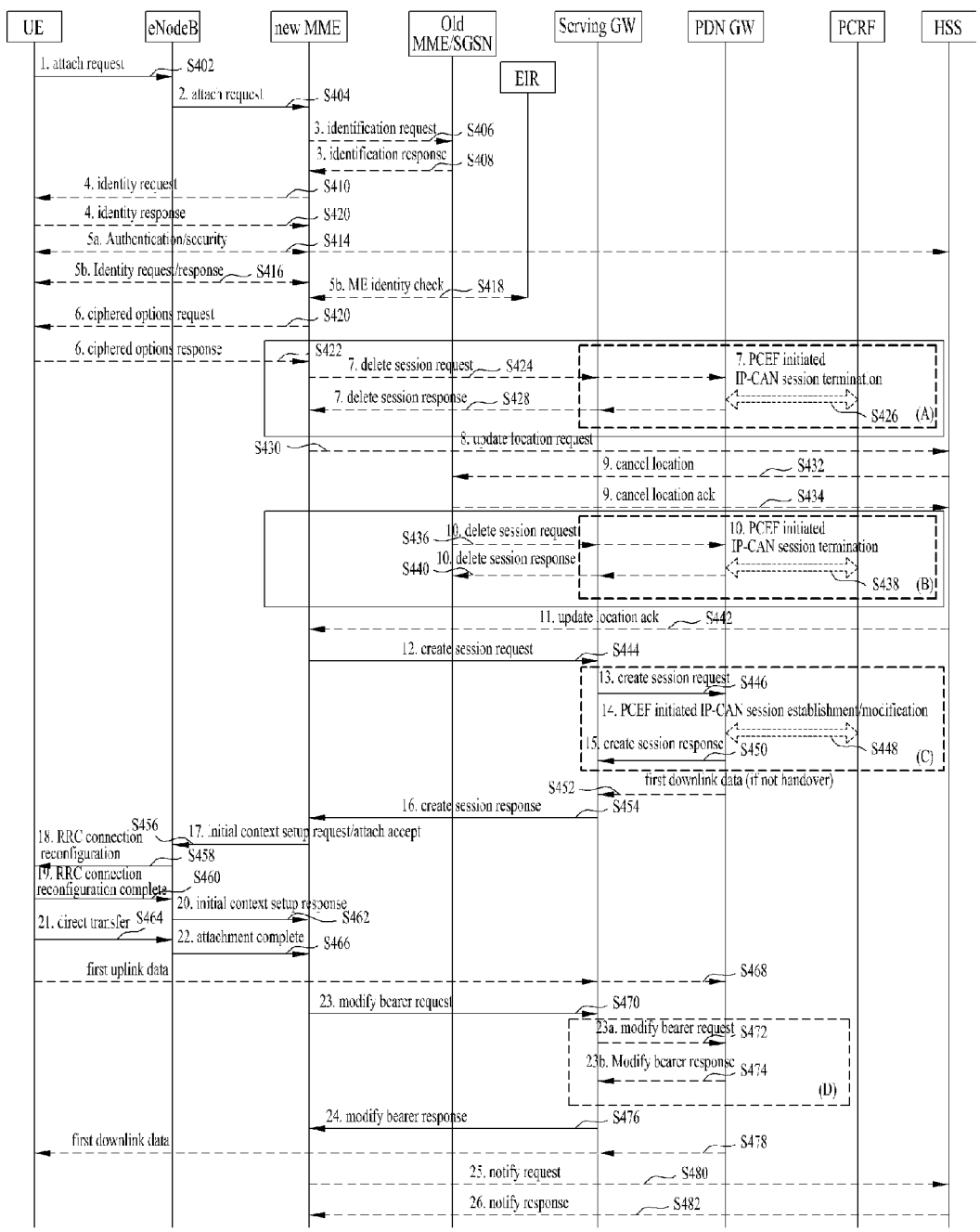
FIG. 4 is a diagram for explanation of a network attachment method according to an embodiment of the present invention.

FIG. 4 is a diagram for explanation of a network attachment method according to an embodiment of the present invention.

A cell is described as a combination of necessary downlink (DL) resource and optional uplink UL resources. That is, DL or DL/UL may be set to a cell provided to a UE by an eNB. Linkage between information (e.g., carrier frequencies) of DL resources and information of UL resources is explicitly indicated by system information.

When the UE is to receive a service requiring registration from a network system, the UE should register to a network. This registration is called network attachment. FIG. 4 illustrates a network attachment procedure.

During the network attachment, "always-on IP connectivity" may be enabled for the UE by establishing a default evolved packet system (EPS) bearer. In an attachment procedure, one or more dedicated bearer establishment procedures may be triggered to establish the dedicated EPS bearer for the UE. Further, the UE may request IP address allocation during the attachment procedure. The network attachment procedure illustrated in FIG. 4 corresponds to Section 5.3.2 of 3GPP LTE-A TS 23.401.

Figure 5:
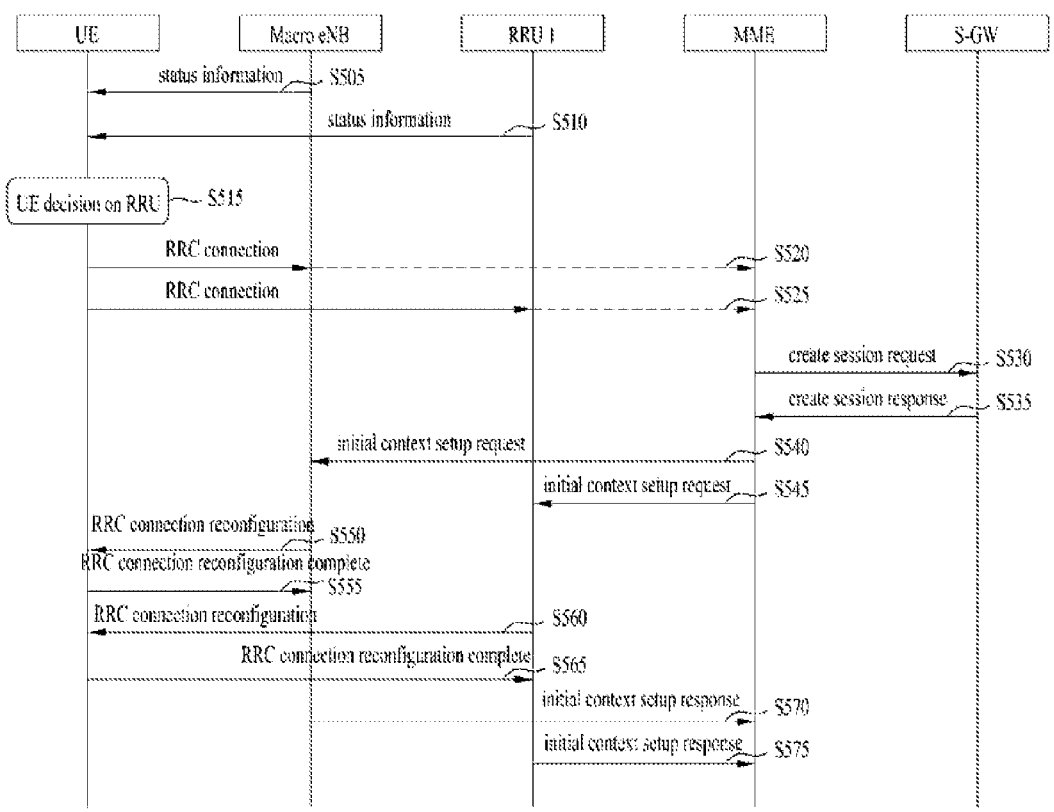
FIG. 5 is a diagram for explanation of a network attachment method according to another embodiment of the present invention.
Figure 6:
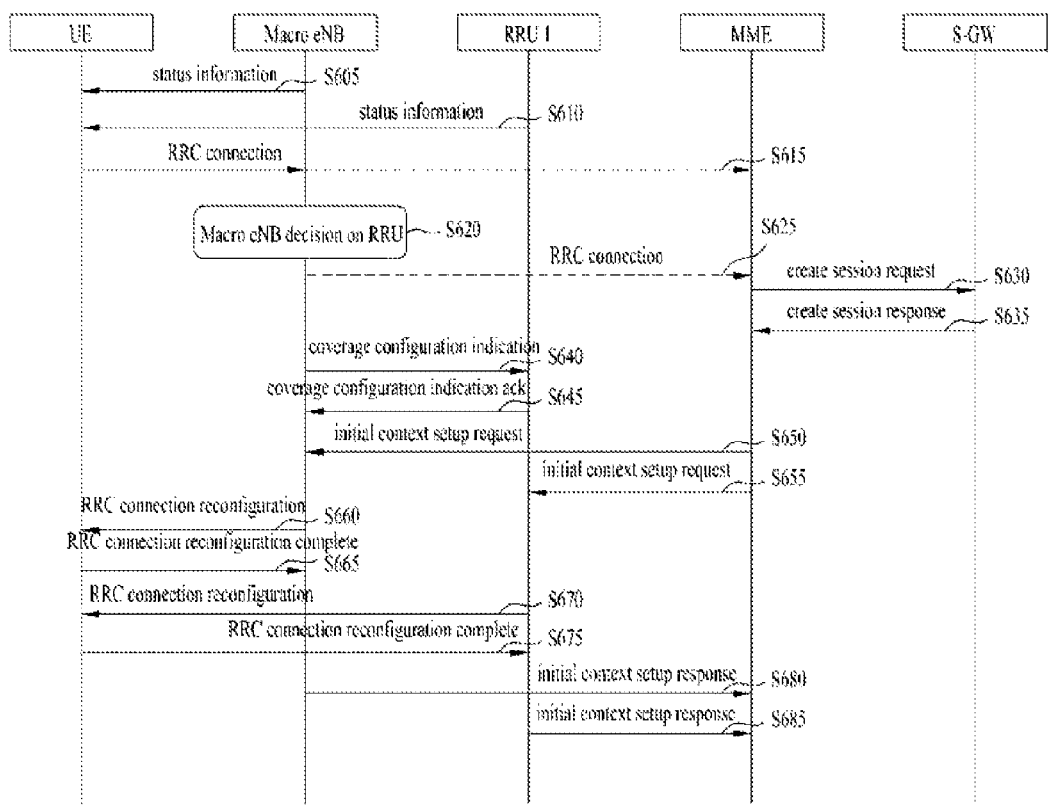
FIG. 6 is a diagram for explanation of a network attachment method according to another embodiment of the present invention.

FIGS. 5 and 6 are diagrams for explanation of network attachment methods according to another embodiment of the present invention.

Considering a future highly dense small cell deployment, UE-centered zone setting will be a significant issue as one of features provided by the deployment scenario, unlike in current network deployment. For this purpose, the current attachment procedure needs to be improved. In addition, when RRUs separated from a BBU change a linkage with one or more macro eNB, linkage between a UE and an RRU will also be an important issue. This is because the future-generation wireless access network will conduct communication through UE-centered zones, not conventional physical cell-based communication, as described before.

An object of an embodiment of the present invention that will be described later is to enable UE-centered zone setting beyond conventional cell-level connectivity. That is, a UE may transmit information about RRHs that the UE wants to be kept connected to a macro eNB or the macro eNB that receives a measurement report message from the UE may set RRHs that can provide optimum connectivity to respective UEs.

FIG. 5 illustrates an embodiment in which a UE determines an RRU that the UE is to be connected. FIG. 6 illustrates an embodiment in which a macro eNB determines an RRU that a UE is to be connected based on a measurement report message from the UE. In FIGS. 5 and 6, an RRU 1 may indicate an RRU that is separated from a BBU in a C-RAN deployment.

In FIG. 5, a UE receives status information about a macro eNB and status information about the RRU 1 from the macro eNB and the RRU 1, respectively (S505 and S510). The status information may be contained in a DL signal and received from the macro eNB and the RRU 1. In addition, the status information may include information about load status (hardware load, a S1 transport network layer (TNL) load, etc.) or information about radio resource usage status of the macro eNB and the RRU 1.

The RRU 1 may transmit information about a macro eNB mapped to the RRU 1 as well as information about the load status or resource status to the UE. That is, the status information received by the UE from the RRU 1 may also include information about attachment relation of the RRU 1. This attachment relation may indicate whether the RRU 1 is positioned within coverage of a specific macro eNB.

The UE determines an RRU that is in a best status to be connected to the UE based on the received status information (S515). For example, the UE may receive status information from one or more RRUs as well as the RRU 1. Thus, the UE may select one or more RRUs, whose measured degree of supporting the UE is equal to or greater than a threshold, based on the received status information. The UE may determine one optimum RRU among the selected RRUs or may select an RRU determined to be in a best status to be connected to the UE as an optimum RRU based on the measured value.

Then the UE transmits an attach request message to the macro eNB and the RRU 1 that transmit the status information (S520 and S525). This procedure of transmitting the attach request message may be simultaneously performed on the macro eNB and the RRU 1. The attach request message transmitted by the UE may be used to request initiation of the network attachment procedure for UE-centered zone setting. The attach request message may be one of Non-Access Stratum (NAS) messages which are transmitting to a Mobility Management Entity (MME), and may be included in RRC message transmitted through RRC connection between the UE and macro eNB and/or RRU 1.

The attach request message may include at least one of "a field indicating a network attachment procedure for UE-centered zone setting, an RRU ID (PCID) or E-UTRAN cell global identifier (ECGI) of an RRU that is selected to be connected by the UE, an RRU ID of one or more RRUs preferred by the UE, and/or an ID of a macro eNB of a macro cell that provides the current best link quality to the UE. The RRU that is selected to be connected by the UE may be the RRU 1 that receives the status information or another RRU other than the RRU 1.

In detail, the attach request message transmitted to the macro eNB from the UE may include information about the RRU selected by the UE and the attach request message to the RRU from the UE may include information about the macro eNB that provides the best link quality. The macro eNB and the RRU 1 that receive the attach request message transmit the received massage to the MME.

Upon receiving the attach request message to request initiation of the network attachment procedure, the MME transmits a session configuration request message to a serving gateway (S-GW) (S530). When the UE requests connection with one or more RRUs for UE-centered zone setting, the MME may await reception of attach request messages from all RRUs prior to transmission of the session configuration request message. That is, upon receiving the attach request messages from all RRUs for UE-centered coverage setting, the MME collects the RRC connection messages and transmits a create session request message to the S-GW. However, when the MME cannot receive the attach request messages from the RRUs within a predetermined period of time, the MME may consider that a problem occurs during the network attachment procedure and notify the RRU and the UE of the problem.

The MME receives a create session response message about the macro eNB and the RRU associated with the network attachment procedure of the UE from the S-GW (S535). Then the MME transmits initial context setup request messages to the macro eNB and the RRU (S540 and S545). The initial context setup request message is a response to the attach request message and may include information about admission of network attachment of the UE.

After receiving the initial context setup request message, the macro eNB and the RRU transmit RRC connection reconfiguration messages to the UE for UE coverage (or zone) setting (S550 and S560). The RRC connection reconfiguration messages may include EPS radio bearer IDs between the UE and the macro eNB/the RRU.

When bearers between the UE and the macro eNB/the RRU are created, the UE transmits RRC connection reconfiguration complete messages to the macro eNB and the RRU (S555 and S565). Then the macro eNB and the RRU that receive the RRC connection reconfiguration complete message transmit an initial context configuration response message to the MME (S570 and S575).

Through the above procedure, the UE may perform network attachment on the RRU and the macro eNB. Then the UE may be connected to the macro eNB and the RRU to communicate with the macro eNB and the RRU.

FIG. 6 is a diagram for explanation of a network attachment method according to another embodiment of the present invention. Unlike in FIG. 5, FIG. 6 illustrates a case in which the macro eNB determines an RRU that the UE is to be connected. A repeated detailed description of FIGS. 5 and 6 will not be given herein.

The macro eNB receives the attach request message containing one or more RRUs that are preferred by the UE from the UE (S615). The attach request message may be similar or the same as in FIG. 5 and may include RRU IDs (PCID and ECGI) of one or more RRUs.

The macro eNB may determine an RRU that can provide optimum connectivity to the UE in consideration of a load status, a resource usage status, etc. of RRUs that the macro eNB recognizes (S620). Then the macro eNB transmits the attach request message received from the UE together with information about the selected RRU to the MME (S625).

Upon receiving the attach request message, the MME can know information about the macro eNB and the RRU that are to be connected to the UE. Then the MME transmits a create session request message for session setting to the S-GW (S630).

Upon determining an optimum RRU to be connected to the UE, the macro eNB can notify the determined RRU of this information. That is, the macro eNB transmits a coverage configuration indication message indicating connection with the UE to the RRU (e.g., RRU 1) to be connected to the UE (S640). The coverage configuration indication message may include "a field indicating that the message for requesting connection with a UE, UE identification information (international mobile subscriber identity (IMSI), globally unique temporary identity (GUTI), and a UE-specific discontinuous reception (DRX) parameter)", etc.

The RRU 1 that receives the coverage configuration indication message transmits a coverage configuration indication ACK that indicates reception of the message to the macro eNB (S645).

The MME receives the create session response message from the S-GW (S635) and transmits initial context setup request messages to the macro eNB and the RRU 1 (S650 and S655). Subsequent procedures of establishing RRC connection with the UE by the macro eNB and the RRU and transmitting the initial context configuration response message to the MME (S660 to S685) may be similar or the same as procedures described with reference to FIG. 5. According to the above embodiment of FIG. 6, the UE may be connected to the macro eNB and the RRU and may communicate with the macro eNB and the RRU.

4. Method of Changing Attachment of RRU

As described above, the RRU can change attachment with a specific macro eNB over time. In addition, a mapping relation between the RRU and the BBU may also be changed over time. As the relation with the macro eNB is changed, a UE-centered zone may be changed irrespective of the mobility of the UE.

Figure 7:
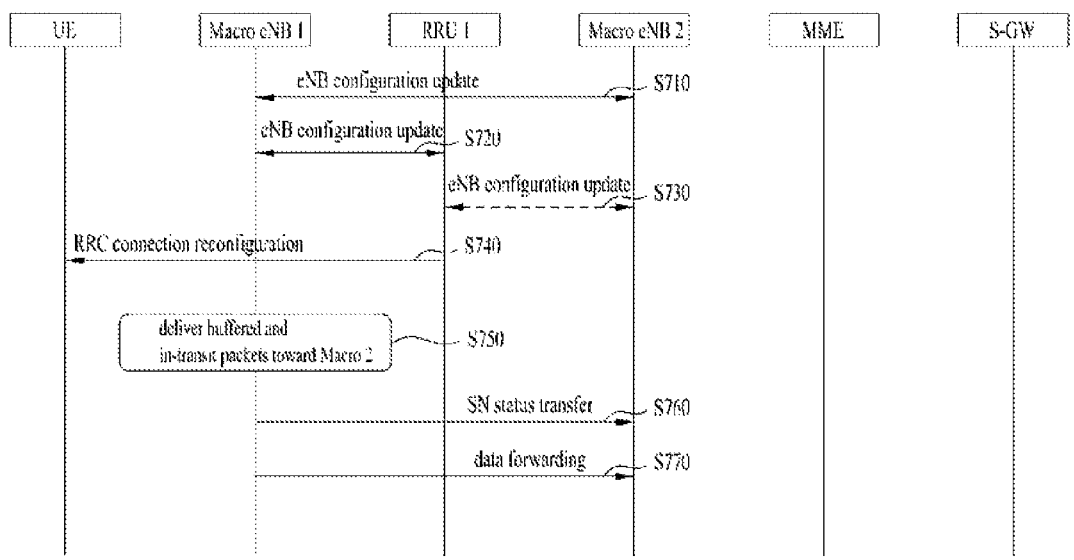
FIG. 7 is a diagram for explanation of a method of changing attachment of an RRU according to an embodiment of the present invention.
Figure 8:
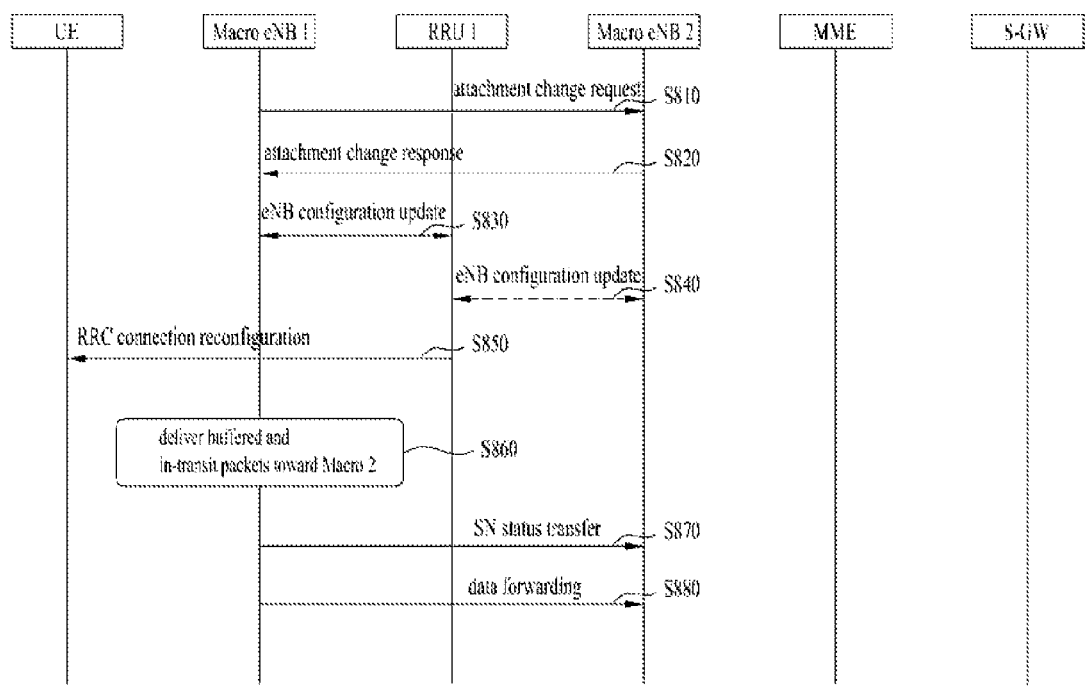
FIG. 8 is a diagram for explanation of a method of changing attachment of an RRU according to an embodiment of the present invention.
Figure 9:
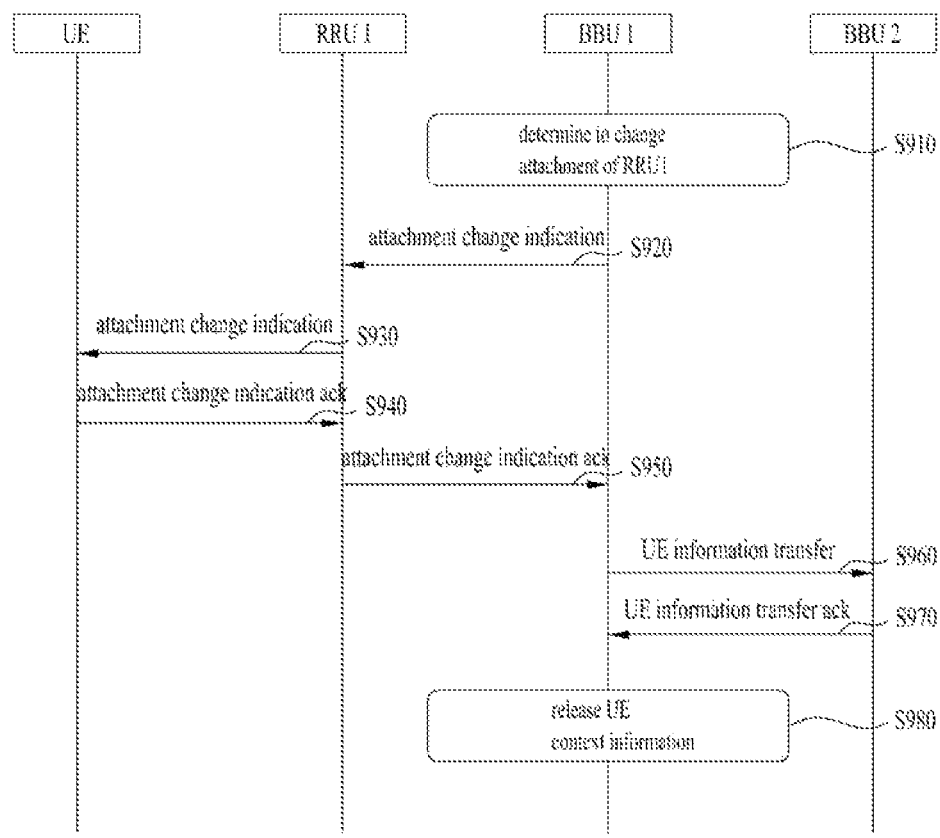
FIG. 9 is a diagram for explanation of a method of changing attachment of an RRU according to an embodiment of the present invention.
Figure 10:
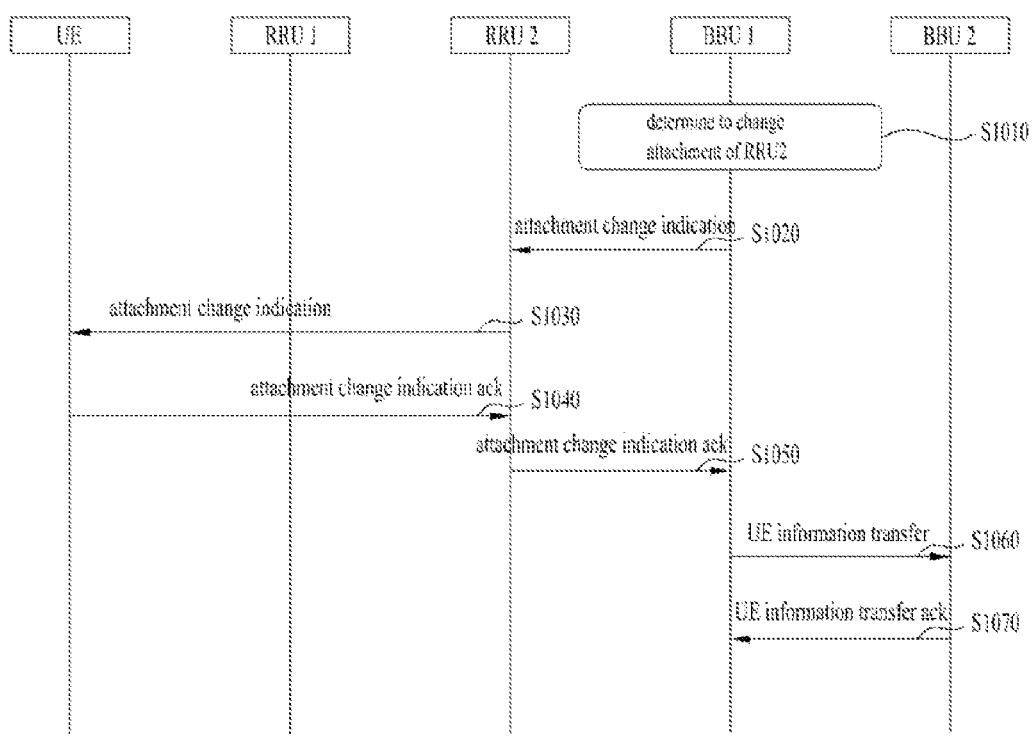
FIG. 10 is a diagram for explanation of a method of changing attachment of an RRU according to an embodiment of the present invention.

FIGS. 7 and 8 illustrate a method of changing attachment of the RRU with the macro eNB. FIGS. 9 to 11 illustrate a procedure of changing attachment of the RRU with the BBU.

FIG. 7 is a diagram for explanation of a method of changing attachment of the RRU according to an embodiment of the present invention. In FIG. 7, the macro eNB and the RRU may be connected via an ideal backhaul/a non-ideal backhaul, or a wireless backhaul, etc. and the RRU may be controlled by a specific macro eNB. In addition, each RRU is identified by an RRU ID.

FIG. 7 is based on the assumption that the UE is connected to a macro eNB 1 and the RRU 1 to perform communication through the procedures described with reference to FIGS. 5 and 6. In this environment, the RRU 1 can change attachment to a macro eNB 2 while the RRU 1 attaches (is connected to) with the macro eNB. The procedure of changing attachment of the RRU can be performed between the RRU and the macro eNB by an eNB configuration update procedure via an X2 interface.

The macro eNB 1 that currently has connectivity with the RRU determines to change the connectivity with the RRU 1 to the macro eNB 2. The determination may be based according to capacity or load status of the macro eNB 1 and the macro eNB 2 or the macro eNB connected to the RRU 1 may be changed over time.

When connectivity (or attachment) with the RRU 1 is determined to be changed, an eNB configuration update message is transmitted and received between the macro eNB 1 and the macro eNB 2 (S710). The macro eNB 1 may transmit information about the RRU 1, connectivity of which will be changed, to the macro eNB 2 or may transmit the eNB configuration update message to the RRU 1 (S720) and the RRU 1 may transmit the eNB configuration update message to the macro eNB 2 (S730).

The eNB configuration update message may include at least one of "a field indicating that connectivity with the RRU 1 will be changed, a field indicating current connectivity (attachment) of the RRU 1, a field indicating connectivity of the RRU 1, which will be changed, a field indicating a point of time when the connectivity of the RRU 1 is changed, and/or a field indicating context information of the UE that receives a service from the RRU 1". The UE context information can be used for admission control of the RRU 1 by the macro eNB 2.

Then the RRU 1 transmits a RRC connection reconfiguration message indicating that a macro eNB to which the RRU 1 is connected will be changed to the UE (S740). The RRC connection reconfiguration message may include information connectivity with the macro eNBs 1 and 2 and information about a point of time when the connectivity is changed. In addition, the RRC connection reconfiguration message may be transmitted to the UE on a control channel such as ePDCCH (a UE in an RRC idle state) or RRC signaling (a UE in an RRC connected state).

The UE that receives the RRC connection reconfiguration message can know that the macro eNB connected to the RRU 1 will be changed to the macro eNB 2 from the macro eNB 1. Then the UE may perform network attachment with a new macro eNB 2 using the information about a point of time when the connectivity contained in the RRC connection reconfiguration message is changed. That is, after a point of time when the connectivity with the RRU 1 is changed, the UE may be connected to the macro eNB 2, may release the connectivity with the macro eNB 1, and may be connected to the RRU 1 and the macro eNB 2. Then the UE may communicate with the RRU 1 and the macro eNB 2.

The macro eNB 1 transmits a packet stored in a buffer and a currently transmitted packet to the macro eNB 2 (S750) and performs serial number (SN) status transfer and data forwarding procedure on the macro eNB 2 (S760 and S770).

FIG. 8 is a diagram for explanation of a method of changing attachment of an RRU according to an embodiment of the present invention. In FIG. 7, when an event for a connectivity changing procedure of the RRU 1 is triggered, an attachment changing procedure of the RRU 1 is performed without a separate request. On the other hand, FIG. 8 illustrates a procedure of negotiation of an attachment changing procedure of the RRU 1 by request with the macro eNB.

When connectivity of the RRU 1 is determined to be changed, the macro eNB 1 transmits an attachment change request message indicating this information to the macro eNB 2 (S810). The attachment change request message may include at least one of "a field indicating that connectivity of the RRU 1 is changed, a field indicating a macro eNB that is currently connected to the RRU 1, a field indicating a macro eNB to which the RRU 1 will be connected, a field indicating a point of time when the connectivity of the RRU 1 is changed, and/or a field indicating context information of UEs that receive a service from the RRU 1".

The macro eNB 2 performs an admission control procedure on the RRU 1 based on the received attachment change request message. Then the macro eNB 2 determines to be connected to the RRU 1 and then transmits an attachment change response message to the macro eNB 1 (S820). When the macro eNB 2 wants to a point of time when the connectivity with the RRU 1 is changed, the macro eNB 2 adds information about the point of time about the change in connectivity to the response message and transmit the response message. When the macro eNB 2 does not want connection with the RRU 1, the attachment change response message may include information about this reason.

When the connectivity with the RRU 1 is changed, the macro eNB 1 and/or the macro eNB 2 transmit the eNB configuration update message indicating this information to the RRU 1 (S830 and S840). The eNB configuration update message may be embodied in a similar way to in FIG. 7.

Then the RRU 1 transmits the RRC connection reconfiguration message to the UE via a control channel such as ePDCCH, etc. or RRC signaling (S850). Then procedures (S860, S870, and S880) of transmitting packets to the macro eNB 2 from the macro eNB 1, SN status transfer, and data forwarding may be embodied in the same or similar way to in FIG. 7.

FIG. 9 is a diagram for explanation of a method of changing attachment of an RRU according to an embodiment of the present invention. In the C-RAN deployment in which the RRU and the BBU are separated, which has been described with reference to FIG. 2, the RRU may be associated with one or more BBUs. The connectivity (attachment) of the RRU can always be changed to another BBU by any one BBU according to a status of the BBU. Hereinafter, a method in which the RRU changes the attachment and connectivity with BBUs will be described.

All BBUs in a BBU pool can acquire information about the resource usage status or load status of other BBUs except for the corresponding BBU. The information can be acquired via information exchange between the BBUs in the BBU pool. In FIG. 9, the BBU 1 connected to the RRU 1 can know a current status of the BBU 2 via information exchange with the aforementioned other BBUs. Thus, the BBU 1 determines to change the connectivity of the RRU 1 to the BBU 2 (S910).

Then the BBU 1 transmits an attachment change indication message to the RRU 1 (S920). The attachment change indication message may include at least one of "a field indicating that connectivity will be changed to the BBU 2, a field indicating IDs of UEs that attach with the RRU 1 as a primary RRU, a field indicating the BBU 2 to which the connectivity of the RRU 1 will be changed, a field indicating a point of time when connectivity will be changed, a field indicating a point of time when change of connectivity is completed, a field indicating time taken to change the connectivity, and/or a field indicating a point of time when the connectivity is applied".

The RRU 1 considers it as a primary RRU and transmits the received attachment change indication message to one or more attached UEs (S930). For example, when the RRU 1 that attaches with the primary RRU is associated with the BBU 1 that supports LTE and then changes attachment to the BBU 2 that supports Wi-Fi, the UE needs to know the attachment change procedure of the RRU 1.

In response to this, UEs transmit an attachment change indication ACK message to the RRU 1 (S940) and the RRU 1 transmits the attachment change indication ACK message to the BBU 1 (S950).

Then the BBU 1 considers the RRU 1 as a primary RRU and transmits information about UEs that attach with the BBU 1 and transmits the information to the BBU 2 (S960). The UE information transfer message may include at least one of "a field indicating a message type, a field indicating IDs of UEs, context information of UEs (information associated with UE security, information associated with E-UTRAN radio access bearer (E-RAB), RRC context information, etc.), and/or a field indicating history information of a UE".

The BBU 2 that receives the UE information transfer message transmits a UE information transfer ACK message to the BBU 1 in response to the UE information transfer message (S970). The UE information transfer ACK message may include information about an admitted bearer and information about a bearer that is not admitted, from the context information of the UE, received from the BBU 1.

Upon receiving the UE information transfer ACK message from the BBU 2, the BBU 1 releases the context information of the UE (S980).

Although not illustrated in FIG. 9, a subject for determining the connectivity with the RRU is not limited to the BBU. That is, when a separate BBU controller for controlling a BBU of a BBU pool is present, the connectivity of the RRU can be achieved by the BBU controller.

Determination of whether attachment of the RRU associated with a specific BBU is changed is not limited to a function of the BBU. That is, assuming that the BBU controller has a function of controlling the BBU of the BBU pool, time-variant attachment change of a specific RRU associated with a specific BBU may be performed by the BBU controller.

FIG. 10 is a diagram for explanation of a method of changing attachment of an RRU according to an embodiment of the present invention. Unlike in FIG. 9, FIG. 10 illustrates an embodiment in which connectivity with a secondary RRU is changed. In FIG. 10, the UE is connected to the RRU 1 as a primary RRU and is connected to the RRU 2 as a secondary RRU.

As described with reference to FIG. 9, BBUs can know information about the resource usage status and load status of other BBUs in a BBU pool via information exchange between the BBUs. In this environment, the BBU 1 determines to connect the RRU 2 connected to the BBU 1 to the BBU 2 (S1010). The BBU 1 transmits the attachment change indication message to the RRU 2 (S1020). The attachment change indication message may include at least one of "a field indicating that connectivity will be changed to a BBU 2, a field indicating IDs of attached UEs using the RRU 1 as a secondary RRU, a field indicating the BBU 2 to which the connectivity of the RRU 1 will be changed, a field indicating a point of time when change of connectivity will be initiated, a field indicating a point of time when change of the connectivity is completed, a field indicating time taken to change the connectivity, and/or a field indicating a point of time when change of the connectivity is applied".

The RRU 2 considers the RRU 2 as a secondary RRU and transmits the attachment change indication message to one or more attached UEs based on the attachment change indication message received from the BBU 1 (S1030). In response to the attachment change indication message, UEs transmit an attachment change indication ACK message to the RRU 2 (S1040) and the RRU 2 transmits the attachment change indication ACK message to the BBU 1 (S1050).

Then the BBU 1 considers the RRU 1 as a secondary RRU and transmits information about attached UEs to the BBU 2 (S1060). The UE information transfer message may include at least one of "a field indicating a message type, a field indicating IDs of UEs, context information of UEs (information associated with UE security, information associated with E-RAB, RRC context information, etc.), and/or a field indicating history information of a UE".

The BBU 2 that receives the UE information transfer message transmits a UE information transfer ACK message to the BBU 1 in response to the UE information transfer message (S1070). The UE information transfer ACK message may include information about an admitted bearer and information about a bearer that is not admitted, from the context information of the UE, received from the BBU 1.

Upon receiving the UE information transfer ACK message from the BBU 2, the BBU 1 maintains context information instead of releasing the context information of the UE, unlike in FIG. 9. That is, since UEs that attach with the RRU 2 as a secondary RRU may be attaching with the RRU 1 as a primary RRU, the BBU 1 needs to maintain the context information of the corresponding UEs instead of releasing the context information.

FIG. 11 is a diagram for explanation of a method of changing attachment of an RRU according to an embodiment of the present invention.

In the embodiment of FIG. 11, an RRU 3 is a primary RRU and is simultaneously a secondary RRU. That is, a specific RRU can be a primary RRU with respect to specific UEs and can simultaneously be a secondary RRU with respect to other UEs. Accordingly, FIG. 11 illustrates complex statuses of various UEs connected to the RRU 3.

An overall process may not be greatly different from in the cases of FIGS. 9 and 10 but information contained in the message transmitted and received between the RRU and BBUs may be different from cases of FIGS. 9 and 10. In detail, the attachment change indication message in S1120 may include information about IDs of UEs that are attaching with the RRU 3 as a primary RRU and information of IDs of UEs that are attaching with the RRU 3 as a secondary RRU.

In addition, the RRU 1 transmits the attachment change indication message to UEs that attach with the RRU 1 as primary/secondary RRUs (S1130). The attachment change indication message transmitted to the UEs may include only information about UEs selected from the information received from the BBU 1 according to the connectivity between the UE and the RRU 3 (primary or secondary RRU).

In addition, the UE information transfer message transmitted to the BBU 2 from the BBU 1 in S1160 may include information about all UEs that attach with the RRU 3 as a primary RRU and information about all UEs that attach with the RRU 3 as a secondary RRU.

5. Apparatus Structure

FIG. 12 is a block diagram of a structure of a UE 100, an RRU 200, and a BBU 300 according to an embodiment of the present invention. Although FIG. 12 illustrates a 1:1 communication environment between the UE 100 and the RRU 200, a communication environment between a plurality of UEs and the RRI 200.

In FIG. 12, the UE 100 may include a radio frequency (RF) unit 110, a processor 120, and a memory 130. A conventional eNB 150 may be configured to include a transmitter 212, a receiver 214, a processor 310, and a memory 320. On the other hand, in a C-RAN deployment according to an embodiment of the present invention, components included in the conventional eNB 150 may be embodied to be divided into the RRU 200 and the BBU 300.

Thus, the RRU 200 functioning as a simple antenna may include only the transmitter 212 and the receiver 214. An overall communication process such as signal processing, hierarchical processing, etc. is controlled by the processor 310 and the memory 320 included in the BBU 300. Various connection relations such as 1:1, 1:N, M:1, and M:N (M and N are each a natural number) may be established between the RRU 200 and the BBU 300.

The RF unit 110 included in the UE 100 may include a transmitter 112 and a receiver 114. The transmitter 112 and the receiver 114 may be configured to transmit and receive signals to and from the RRU 200. The processor 120 may be functionally connected to the transmitter 112 and the receiver 114 to control a process of transmitting and receiving signals to and from the RRU 200 and other devices by the transmitter 112 and the receiver 114. The processor 120 performs various processing processes on signals to be transmitted and then transmits the processed signals to the transmitter 112 and performs processing on the signals received by the receiver 114.

As necessary, the processor 120 may store information contained in exchanged message in the memory 130. Based on this structure, the UE 100 can perform various methods according to the aforementioned embodiments of the present invention.

The transmitter 212 and the receiver 214 of the RRU 200 may be configured to transmit and receive signals to and from the UE 100. The processor 310 of the BBU 300 connected to the RRU 200 may be functionally connected to the transmitter 212 and the receiver 214 of the RRU 200 to control a process of transmitting and receiving signals to and from other devices by the transmitter 212 and the receiver 214. The processor 310 performs various processing processes on signals to be transmitted and then transmits the processed signals to the transmitter 212 and performs processing on the signals received by the receiver 214. As necessary, the processor 310 may store information contained in exchanged message in the memory 320. Based on this structure, the RRU 200 and the BBU 300 can perform various methods according to the aforementioned embodiments of the present invention.

The processors 120 and 310 of the UE 100 and the BBE 300 requests (e.g., controls, manipulates, manages, etc.) operations of the RRU 200 and the BBU 200, respectively. The processors 120 and 310 may be connected to the memories 130 and 320 for storing program codes and data, respectively. The memories 130 and 320 may be connected to the processors 120 and 310 to stores operating system (OS), an application, and general files.

The processors 120 and 310 according to the present invention can also be called a controller, a microcontroller, a microprocessor, a microcomputer, etc. The processors 120 and 310 may be embodied in the form of hardware, firmware, software, or a combination thereof. When an embodiment of the present invention is embodied using hardware, the processors 120 and 310 may include application specific integrated circuits (ASICs), digital signal processors (DSPs), digital signal processing devices (DSPDs), programmable logic devices (PLDs), field programmable gate arrays (FPGAs), or the like which is configured to embody the present invention. The embodiments of the present invention may be written as computer programs and can be implemented in general-use digital computers that execute the programs using a computer readable recording medium. In addition, a structure of data used in the above-described method may be recorded in a computer readable recording medium through various methods. Program storage devices used for description of a storage device containing an executable computer code for execution of the various methods according to the present invention is not understood as temporary objects such as carrier waves or signals. Examples of the computer readable recording medium include magnetic storage media (e.g., ROMs, floppy disks, hard disks, etc.) and optical recording media (e.g., CD-ROMs, or DVDs).

The embodiments of the present invention may have the following advantageous effects.

First, a UE-centered zone can be established when a UE performs network attachment in a heterogeneous cell environment.

Second, connectivity between an RRU and a macro eNB can be changed according to a system status to effectively support network attachment of the UE.

Third, connectivity between the RRU and the BBU can be changed to reliably support network attachment of the UE.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for network attachment of a user equipment (UE) in a heterogeneous cell environment in which a macro cell and a small cell coexist, the method comprising:
receiving first status information associated with one or more remote radio units (RRUs) for supporting the small cell from the one or more RRUs;
receiving second status information associated with one or more macro cells from one or more macro eNBs for supporting the macro cell;
selecting an RRU and a macro eNB, which the UE wants to attach, among the one or more RRUs and among the one or more macro eNBs based on the first status information and the second status information;
simultaneously transmitting an attach request message to the selected RRU and the selected macro eNB, wherein the attach request message is for requesting network attachment to the selected RRU and the selected macro eNB;
receiving a first RRC (Radio Resource Control) connection reconfiguration message for a radio bearer configuration, from the selected RRU and the selected macro eNB; and
transmitting an RRC connection reconfiguration complete message, to the selected RRU and the selected macro eNB, when the radio bearer configuration with the selected RRU and the selected macro eNB is completed according to the first RRC connection reconfiguration message,
wherein the attach request message transmitted to the selected RRU further comprises information about a macro eNB providing best link quality to the UE among the one or more macro eNBs, and
wherein the attach request message transmitted to the selected macro eNB further comprises information about the selected RRU among the one or more RRUs.

2. The method according to claim 1, wherein the selecting comprises selecting an RRU providing connectivity that is equal to or greater than a threshold to the UE among the one or more RRUs and selecting an RRU providing optimum connectivity as an RRU that the UE wants to connect among the RRUs providing the connectivity that is equal to or greater than the threshold.

3. The method according to claim 1, wherein the first status information and the second status information comprises information about load status and resource usage status of the one or more RRUs and the one or more macro eNB, respectively.

4. The method according to claim 1, further comprising receiving a second RRC connection reconfiguration message indicating that a macro eNB that will be connected to the selected RRU from the selected RRU.

5. The method according to claim 4, further comprising:
acquiring information about a point of time when connectivity of the selected RRU is changed, from the second RRC connection reconfiguration message; and
performing network attachment with a macro eNB to which the selected RRU is newly connected, after the point of time.

6. A user equipment (UE) for network attachment in a heterogeneous cell environment in which a macro cell and a small cell coexist, the UE comprising:
a transmitter;
a receiver; and
a processor connected to the transmitter and the receiver to perform network attachment,
wherein the processor
controls the receiver to receive first status information associated with one or more remote radio units (RRUs) for supporting the small cell from the one or more RRUs and to receive second status information associated with the macro cell from one or more macro eNBs for supporting the macro cell,
selects an RRU and a macro eNB, which the UE wants to attach, among the one or more RRUs and among the one or more macro eNBs based on the first status information and the second status information,
controls the transmitter to simultaneously transmit an attach request message to the selected RRU and the selected macro eNB, wherein the attach request message is for requesting network attachment to the selected RRU and the selected macro eNB,
controls the receiver to receive a first RRC (Radio Resource Control) connection reconfiguration message for a radio bearer configuration, from the selected RRU and the selected macro eNB, and
controls the transmitter to transmit an RRC connection reconfiguration complete message, to the selected RRU and the selected macro eNB, when the radio bearer configuration with the selected RRU and the selected macro eNB is completed according to the first RRC connection reconfiguration message,
wherein the attach request message transmitted to the selected RRU further comprises information about a macro eNB providing best link quality to the UE among the one or more macro eNBs, and
wherein the attach request message transmitted to the selected macro eNB further comprises information about the selected RRU among the one or more RRUs.

7. The UE according to claim 6, wherein the processor selects an RRU providing connectivity that is equal to or greater than a threshold to the UE among the one or more RRUs and selects an RRU providing optimum connectivity as an RRU that the UE wants to connect among the RRUs providing the connectivity that is equal to or greater than the threshold.

8. The UE according to claim 6, wherein the first status information and the second status information comprises information about load status and resource usage status of the one or more RRUs and the one or more macro eNB, respectively.

9. The UE according to claim 6, wherein the processor controls the receiver to receive a second RRC connection reconfiguration message indicating that a macro eNB that will be connected to the selected RRU from the selected RRU.

10. The UE according to claim 9, wherein the processor acquires information about a point of time when connectivity of the selected RRU is changed, from the second RRC connection reconfiguration message and performs network attachment with a macro eNB to which the selected RRU is newly connected, after the point of time.

\* \* \* \* \*